(12) United States Patent
Sapir

(10) Patent No.: US 6,817,235 B2
(45) Date of Patent: Nov. 16, 2004

(54) TIRE PRESSURE SENSOR

(76) Inventor: Itzhak Sapir, 27 Foxhill St., Irvine, CA (US) 92604

( * ) Notice: Subject to any disclaimer, the term of this patent is extended or adjusted under 35 U.S.C. 154(b) by 19 days.

(21) Appl. No.: 10/680,029

(22) Filed: Oct. 7, 2003

(65) Prior Publication Data
US 2004/0069057 A1 Apr. 15, 2004

Related U.S. Application Data
(60) Provisional application No. 60/416,771, filed on Oct. 8, 2002, and provisional application No. 60/416,926, filed on Oct. 9, 2002.

(51) Int. Cl.[7] .......................... G01M 17/02; B60C 23/02
(52) U.S. Cl. .......................... 73/146; 73/146.8; 340/442
(58) Field of Search ................................ 73/146–146.8; 340/338, 442–448

(56) References Cited

U.S. PATENT DOCUMENTS 5,837,891 A * 11/1998 Bridge ........................ 73/146.8
6,194,998 B1 * 2/2001 Huang ......................... 340/442
6,300,867 B1 * 10/2001 Rea et al. .................... 340/442

* cited by examiner

Primary Examiner—Edward Lefkowitz
Assistant Examiner—Jermaine Jenkins
(74) Attorney, Agent, or Firm—Clement Oheng

(57) ABSTRACT

A tire pressure monitoring and reporting instrument is mounted within a valve stem and has a valve cap. A single circuit can be provided having an LED, a sounder, a battery and a switch. A dual stage system, or a continuously variable system can be implemented by using a dual stage pressure switch or a continuously variable pressure switch. The battery may be housed within the cap and electrical contacts between the cap and stem allow discontinuation of the circuit or changing of the battery.

24 Claims, 4 Drawing Sheets

TIRE PRESSURE SENSOR

This application claims the benefit of provisional application 60/416,771, filed Oct. 8, 2002 and 60/416,926, filed Oct. 9, 2002.

BACKGROUND

Previously, the inflation of a tire required an inner tube. Presently, a single wall design is used on a majority of the automobiles on the market. Proper inflation of the single wall tire is essential to maintaining proper functioning of a vehicle. Driving a car with tire air pressure above or below the recommended level increases fuel consumption and tire wear. There are several risk factors. One is the temperature rise due to increased friction in the underinflated tire that may cause the tire to disintegrate. Another is reduced sheer force strength that may cause tire delamination failure where the tire comes off the wheel during a sharp turn. The third risk factor is poor vehicle handling from uneven tire air pressure.

Previous monitoring devices presented tire pressure indicators solving some of the inflation monitoring problems. The earlier tire pressure indicators simply mounted mechanical air pressure gauges to the stem of the tire inflation valve. Later, audible warning tones were incorporated U.S. Pat. No. 5,535,623 to Heyns shows a tire pressure indicator. Low pressure allowed a user to hear air escaping in a test mode. Tire pressure detecting and warning apparatus in U.S. Pat. No. 6,100,798 to Liang shows a tire pressure warning apparatus where reeds or radio transmitting device allows a warning by sound or lamps that the pressure is too high or too low.

Unfortunately, many of these devices requiring inflation suffer air leakage between the stem and the instruments in the cap device. Also, they can be easily stolen if the vehicle is parked unattended.

OBJECTS OF THE INVENTION

Figure 1A:
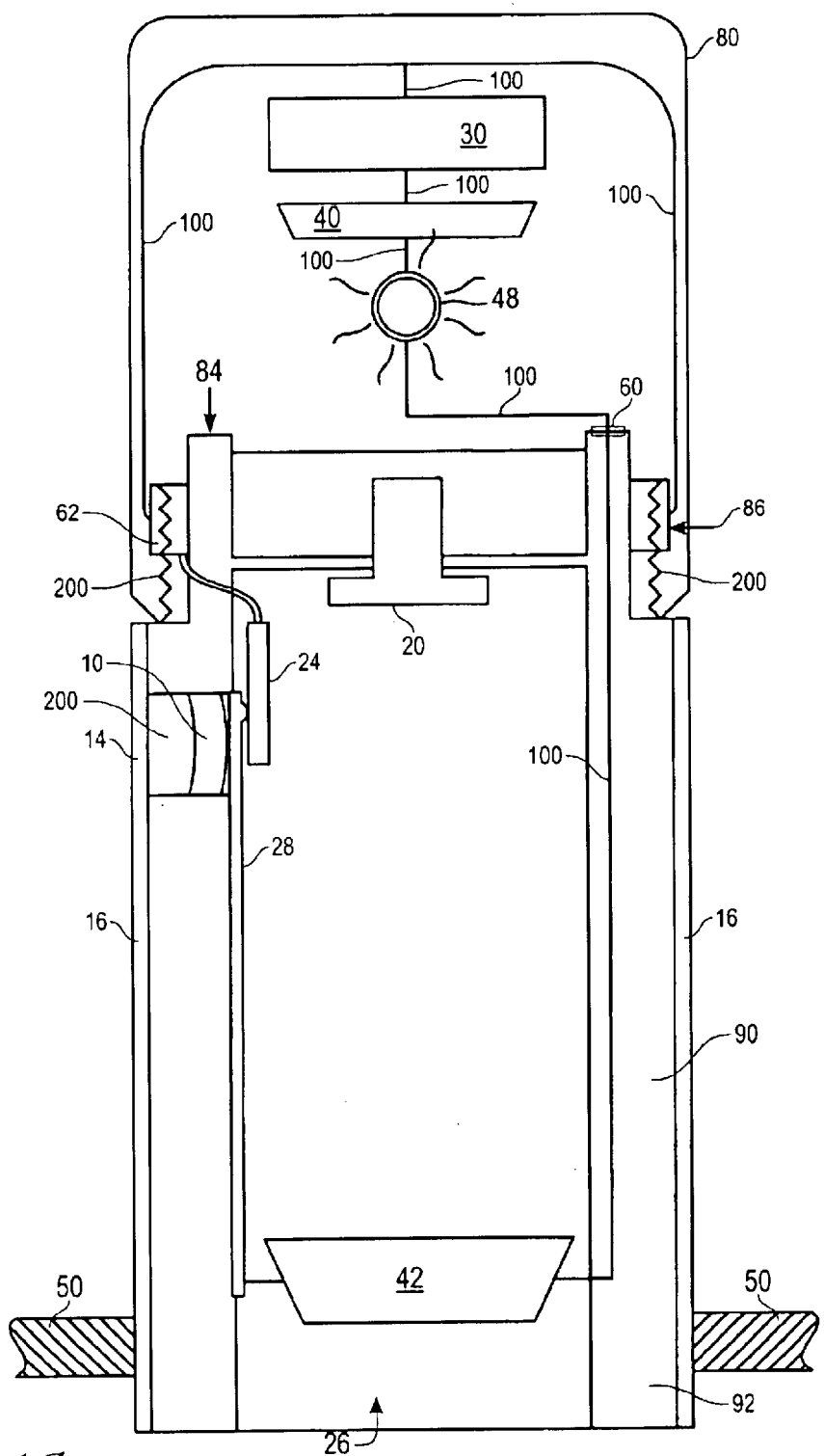
FIG. 1 is a side sectional view of the cap attached to the valve stem.

1. To allow installation identical to that of an ordinary valve stem.
2. To allow the system to withstand the same operation environment as the wheel in terms of water, heat, cold, vibration and shock.
3. To allow easy replacement of the battery power source.

DETAILED DESCRIPTION OF THE PREFERRED EMBODIMENT

This application claims priority from provisional application 60-416926, and 60-416771 incorporated herein by reference.

The proposed system monitors tire air pressure and provides a low air pressure warning by sight or sound. The proposed system is built inside the air inflation valve stem 90, FIG. 1. The stem can house an air pressure sensor with a pressure actuated moving part 10, FIG. 1 and a cantilever leaf spring 28, a power source 30, and sound making component like a speaker 40. In the preferred embodiment a portion of the system is housed in the cap 80 that attaches to the valve stem 90. The cap member 80 can screw on to the valve stem 90 as in ordinary valves. A casual user ordinarily sees the valve stem 90, the valve pin 20 and the cap 80.

Figure 1B:
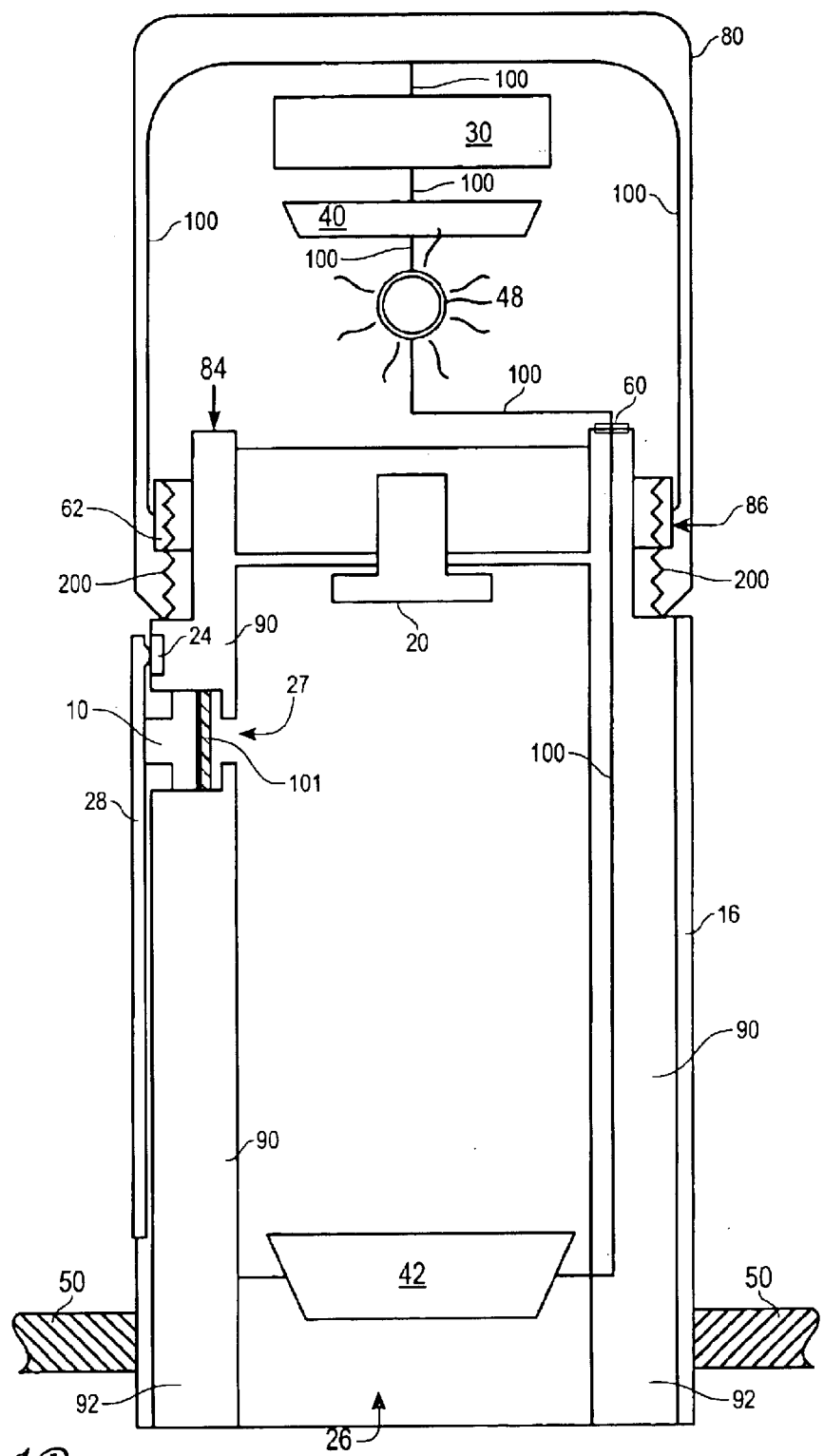
Figure 2:
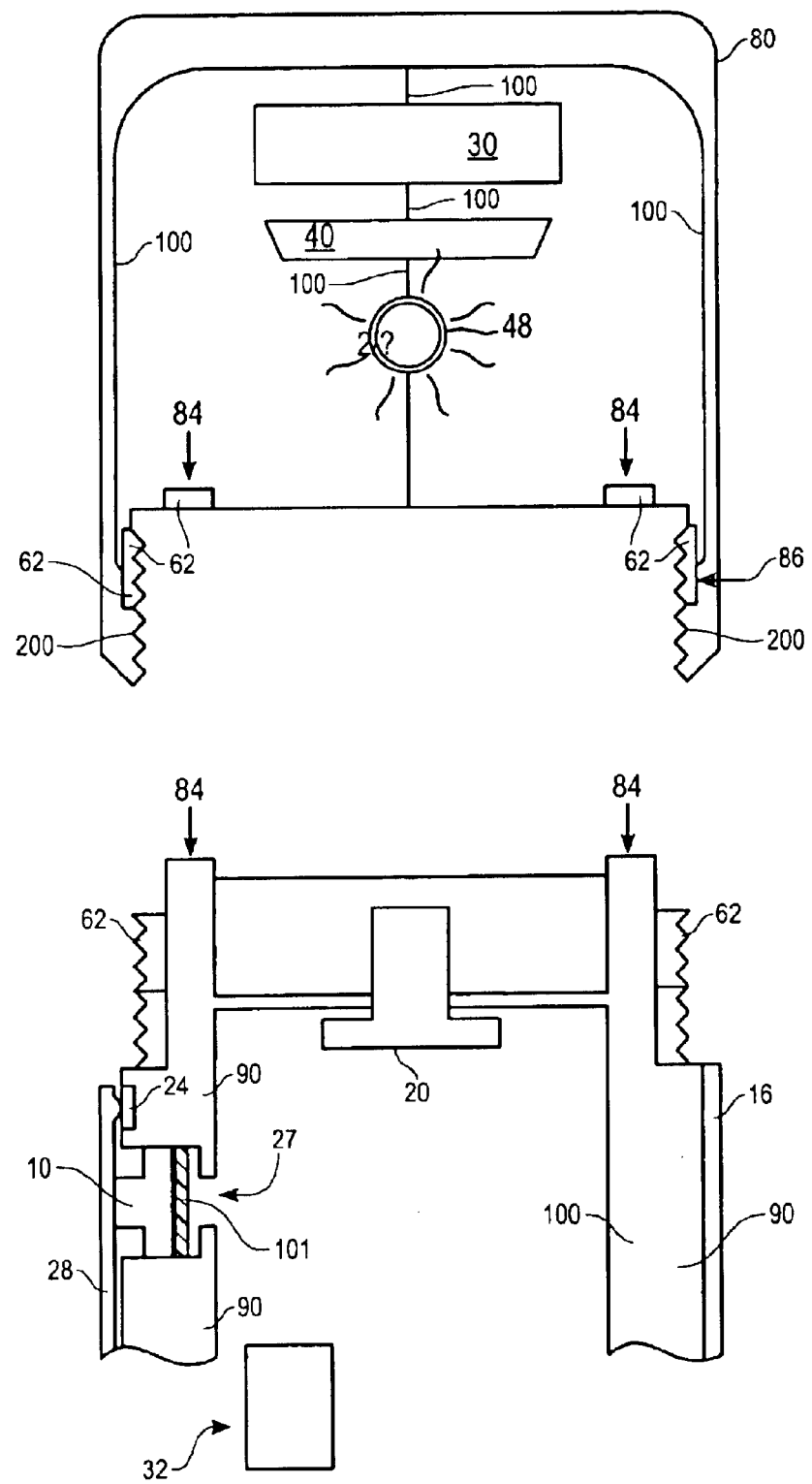
FIG. 2 is a side sectional view of the cap removed from the valve stem.
Figure 3:
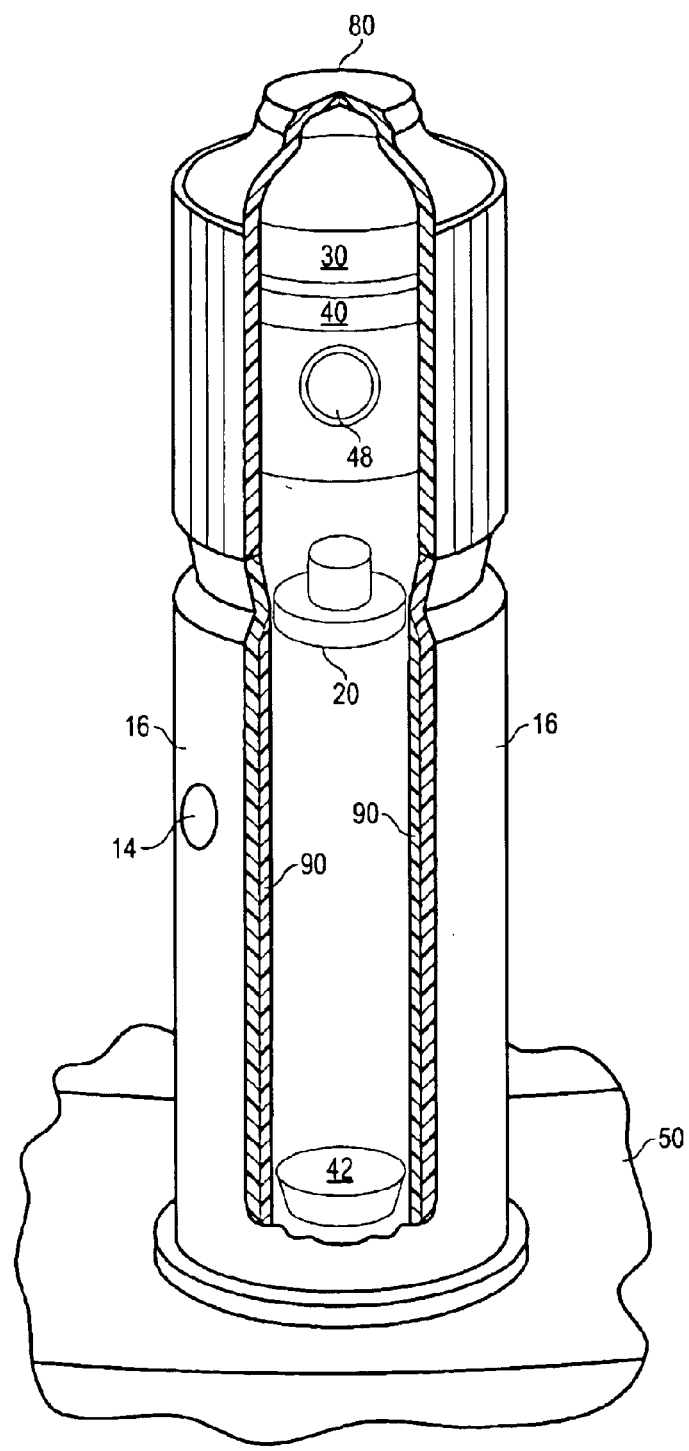
FIG. 3 is a perspective view of the invention.

FIG. 1a shows the pressure sensor switch inside the pressurized portion of the valve stem. FIG. 1b shows the pressure sensor switch outside the pressurized portion of the valve stem. The pressure sensor switch can be implemented in both orientations. An air passage 27 directs pressurized air inside the stem to a membrane and moving part 10.

The test switch 14 is included within the valve stem 90 and a user upon closer inspection may press the test switch 14 to test the circuit. The test switch is formed of a rubber cover over the valve stem 90. The cover can be formed integrally with the stem, or separately. The rubber cover can be pressed inward and can move the moving part 10 inward so that it completes the circuit between the spring 28 and contact 24. This is the same physical motion that occurs during low pressure. A user may use a finger to press the test switch. The user will then see the visual signal 48 and the audible signal 40 if the user has a good battery 30 and otherwise complete circuit. The test switch determines the strength of the battery as well as the remainder of the electrical connections necessary for completing the circuit. Although rubber is a preferred material, a wide variety of synthetic flexible substitute materials are available.

The electronic circuit begins at a battery leading to an interface 60 between the cap and stem. The interface allows an electrical connection between the battery and a portion of the stem. That portion of the stem allowing electrical connection has a conductive surface such as a metal surface allowing electrical connection between the cap and stem. The electrical connection proceeds to the leaf spring switch contact 24 that electrically conducts with of the leaf spring switch 28 when the leaf spring 28 is biased against the contact 24.

The leaf spring or other kind of spring is connected to a moving part 10 that moves according to changes in outside air pressure and air pressure in the passage 26. Because the moving part 10 is the only portion that moves within the air tight air passage within the stem, the moving part 10 biases the leaf spring when the inside pressure is low. The moving part 10 can be formed as a valve, piston or membrane. The valve, piston, membrane are equivalent. The moving part 10 can be a valve when it releases air at a specified pressure to prevent excessive air pressure. If the moving part 10 is a membrane, the moving part remains airtight at all pressure ranges. A variety of commercially available membrane and valve parts can be used for the moving part 10.

The electrical connection proceeds to an optional inside speaker 42 that is connected in series with the circuit. The electrical circuit proceeds to a second circuit interface connection 62 at the top of the stem. The second circuit interface connection 62 allows electrical connection between the cap and stem. The second circuit interface connection 62 is preferably formed as an annular contact radially spanning the top of the stem. The first circuit interface connection is also preferably formed as an annular contact around the top of the stem, but electrically isolated from the first circuit interface connection.

The respective interfaces for the conductive material would require a good conductor. The first valve stem electrical contact makes electrical connection with the first valve stem cap electrical contact and the second valve stem electrical contact makes electrical connection with the second valve stem cap electrical contact. The circuit is interrupted when the first valve stem electrical contact is separated from the first valve stem cap electrical contact and the second valve stem electrical contact is separated from the second valve stem cap electrical contact. The circuit is restored when the first valve stem electrical contact is connected to the first valve stem cap electrical contact and the second valve stem electrical contact is connected to the second valve stem cap electrical contact.

From the second interface connection 62, the circuit continues to an optional lamp or visual LED indicator 48. After the LED, the circuit continues to a speaker 40 or sound indicator before ending at the battery. The battery may be housed within the cap and electrical contacts between the cap and stem allow discontinuation of the circuit or changing of the battery.

In an alternate switch embodiment the switch 28 can be a two-stage switch. A dual stage system, or a continuously variable system can be implemented by using a dual stage pressure switch or a continuously variable pressure switch. In a second switch embodiment, the two-stage switch has a first stage contact between a spring and a first contact when pressed to a certain distance and the second stage contact at a further distance between a leaf spring and a second contact. In a third switch embodiment, the switch resistance changes in proportion to the pressure applied to it by the moving part pressure valve 10. This increases the voltage in the speaker and thus the sound level as the air pressure drops.

The one stage pressure switch and two-stage switch are equivalent. The cantilever spring can be implemented in a variety of equivalent manners such as by using a non-cantilever spring. Another equivalent to the cantilever spring is a pressure sensor switch having an air pocket where a pocket of air is pressurized and acts as a spring. The air pocket pressure sensor closes a circuit in the same manner as the cantilever spring, because both respond to force with resilient displacement to close a circuit. The only difference is the use of an air pocket in place of a metal spring. The air pocket can be miniaturized and put on a printed circuit board. In both cases, the air pocket would be equivalent to the cantilever spring. Use of an air pocket spring switch allows the moving part member and membrane to be placed completely within the valve stem.

The system optionally includes a wireless or wired transmitter to transmit an alert or transmit data such as the air pressure readings, or a warning signal to the driver's cabin. Monitoring the voltage in the switched resistance can collect air pressure data. The switch formed by the spring 28 and the contact 24 is a sensor sensing the air pressure on the membrane or piston 10. A variety of electronic pressure monitoring systems are commercially available where pressure sensors vary in electrical resistance according to the pressure reading. A computer can take the reading of the pressure by monitoring the resistance in the pressure sensors. Alternatively, a number of transmitters can take their reading of the pressure by monitoring the pressure sensors and wirelessly send their readings to a computer located within the cabin of the vehicle. The use of transmitters also allows users to send multiple data from various tires to a receiver that can also be sent to a central computer. Many invented devices have made it very useful to analyze data regarding tire pressure using a central computer.

The central computer can also be omitted so that a transmitted warning signal, or data can be received and directly converted into an audible sound or visible signal. In this case, a controller can be used for the conversion of the signal instead of a computer. The one stage and two-stage pressure switch output signal can be transmitted by a transmitter to be received by a receiver having an electrical switch activating a device to create a visible signal or audible sound.

The battery can be contained within the cap. The cap can contain only the battery that powers the remainder of the system circuit via the electrical contacts between the cap and stem. The cap can also contain a battery and warning lamp LED. A user may remove the cap and disable the device when changing the tire, or when deflationary is necessary for maintenance. A user may also replace the battery by replacing the cap. A variety of colors for signal lights can be provided so that a user can change the colors of the lights by changing caps. The cap can be made of a transparent material allowing the user to see the embedded lamp. The cap can also have partially transparent material allowing the user to examine the lamp.

In a separate embodiment, a battery is placed within the stem of the tire inflation valve. Here, a user may also remove the cap and disable the device, because the circuit is not completed when the cap is removed. When the battery is placed within the stem of the tire inflation valve, the battery is selected from a long lasting battery composition such as one of lithium chemical composition which allows the battery to last as long as the tire.

A single circuit can be provided having an LED 48, a sounder 40, a battery 30 and a switch. A pair of circuits necessary for the implementation of a staged system requires a dual circuit having a single battery 30, a sounder 40, and the lamp. The dual stage system completes an additional circuit having a contact 24 of a first resistance, and a second contact 24 of a second resistance. The use of multiple resistances allows the circuit to change resistance and allow different voltages for different sound levels and light levels, which are related to the different pressures that a user may desire to be warned of. A computer for analysis can also monitor the different voltages.

Operation

When the air pressure in the tire is above the recommended level, air pressure pushes the moving part in the pressure sensor and the spring keeping the membrane or piston switch open. When the pressure falls below the threshold level, the spring force overcomes the force created by the air pressure on the membrane and the membrane presses the first stage of the switch and closes the circuit to active the sounder. When the air pressure drops below a lower threshold, the second stage in the switch makes contact and the sound level increases. In the preferred embodiment, a transmitter may be used to transmit these two preset levels to a computer in the cabin. The description above is for a discrete levels air pressure sensor. An optional continuous measurement air pressure sensor may also be used which, after being switched on by the moving part as described above, transmits the actual pressure readings to the cabin.

In the case of a one stage or two-stage sensor the battery consumption is 0 when the circuit is open. If a transmitter and receiver is embedded within the valve stem, the battery in the cap 80 can be used to power the transmitter. The circuit wires 100 are electrically conductive.

In FIG. 1*b* the membrane 101 is airtight and moves according to the air pressure. The membrane 101 pushes the moving part. The moving part biases the spring switch.

CALL OUT LIST OF ELEMENTS

10 Moving Part
14 Test Switch

16 Stem Cover
20 Valve
24 Leaf Spring Switch Contact
26 Air Passage
28 Leaf Spring Switch
30 Battery
32 Power Battery in Stem
40 Cap Speaker
42 Stem Speaker
48 LED
50 Tire Wall
60 Circuit Interface Connection
80 Cap
84 Top Surface Contact
86 Side Surface contact
90 Valve Stem Outside
92 Valve Stem Inside
95 Transmitter

What is claimed is:

1. A pneumatic tire air pressure monitoring device comprising:
   a. a valve stem mountable on the tire; wherein the valve stem has a pair of electrical contacts, a first valve stem electrical contact in series with a second valve stem electrical contact;
   b. a valve stem cap adapted to fit on the valve stem and having a pair of valve stem cap electrical contacts, a first valve stem cap electrical contact in series with a second valve stem cap electrical contact; wherein upon installation of the valve stem cap, the first valve stem electrical contact makes electrical connection with the first valve stem cap electrical contact and the second valve stem electrical contact makes electrical connection with the second valve stem cap electrical contact, wherein the circuit is interrupted when the first valve stem electrical contact is separated from the first valve stem cap electrical contact and the second valve stem electrical contact is separated from the second valve stem cap electrical contact, wherein the circuit restored when the first valve stem electrical contact is connected to the first valve stem cap electrical contact and the second valve stem electrical contact is connected to the second valve stem cap electrical contact,
   c. a battery in series with the circuit for powering the circuit;
   d. a pressure switch in series with the circuit having a lower resistance when the circuit is completed by the pressure switch and having an infinite resistance when the pressure switch opens the circuit;
   e. a sounder device in series with the circuit and producing sound when the circuit is completed by the pressure switch and remaining inactive when the pressures switch opens the circuit.

2. The device of claim 1 wherein the battery is located within the valve cap and wired in series with the circuit between the first valve stem cap electrical contact and the second valve stem cap electrical contact.

3. The device of claim 1 wherein both the battery and the sounder is located within the valve cap and wired in series with the circuit between the first valve stem cap electrical contact and the second valve stem cap electrical contact.

4. The device of claim 1 wherein the pressure switch is two-stage and produces two stage resistance leading to two levels of warning sound corresponding to preset levels of air pressure.

5. The device of claim 1 wherein the pressure switch is continuously variable and produces continuously variable resistance leading to continuously variable levels of warning sound corresponding to air pressure.

6. The device of claim 1 wherein the pressure switch is in the valve stem.

7. The device of claim 1 wherein the pressure switch is a variable resistance pressure switch.

8. The device of claim 1 wherein the pressure switch is a discrete resistance pressure switch.

9. A pneumatic tire air pressure monitoring device comprising:
   a. a valve stem mountable on the tire; wherein the valve stem has a pair of electrical contacts, a first valve stem electrical contact in series with a second valve stem electrical contact;
   b. a valve stem cap adapted to fit on the valve stem and having a pair of valve stem cap electrical contacts, a first valve stem cap electrical contact in series with a second valve stem cap electrical contact; wherein upon installation of the valve stem cap, the first valve stem electrical contact makes electrical connection with the first valve stem cap electrical contact and the second valve stem electrical contact makes electrical connection with the second valve stem cap electrical contact, wherein the circuit is interrupted when the first valve stem electrical contact is separated from the first valve stem cap electrical contact and the second valve stem electrical contact is separated from the second valve stem cap electrical contact, wherein the circuit restored when the first valve stem electrical contact is connected to the first valve stem cap electrical contact and the second valve stem electrical contact is connected to the second valve stem cap electrical contact,
   c. a battery in series with the circuit for powering the circuit;
   d. a pressure switch in series with the circuit having a lower resistance when the circuit is completed by the pressure switch and having an infinite resistance when the pressure switch opens the circuit;
   e. a lamp in series with the circuit and lighting when the circuit is completed by the pressure switch, and remaining inactive when the pressures switch opens the circuit.

10. The device of claim 9 wherein the battery is located within the valve cap and wired in series with the circuit between the first valve stem cap electrical contact and the second valve stem cap electrical contact.

11. The device of claim 9 wherein both the battery and the lamp are located within the valve cap and wired in series with the circuit between the first valve stem cap electrical contact and the second valve stem cap electrical contact.

12. The device of claim 9 wherein the pressure switch is two-stage and produces two stage resistance leading to two levels of warning lamp brightness corresponding to preset levels of air pressure.

13. The device of claim 9 wherein the pressure switch is continuously variable and produces continuously variable resistance leading to continuously variable levels of lamp brightness corresponding to air pressure.

14. The device of claim 9 wherein the pressure switch is in the valve stem.

15. The device of claim 9 wherein the pressure switch is a variable resistance pressure switch.

16. The device of claim 9 wherein the pressure switch is a discrete resistance pressure switch.

17. A pneumatic tire air pressure monitoring device comprising:

a. a valve stem mountable on the tire; wherein the valve stem has a pair of electrical contacts, a first valve stem electrical contact in series with a second valve stem electrical contact;

b. a valve stem cap adapted to fit on the valve stem and having a pair of valve stem cap electrical contacts, a first valve stem cap electrical contact in series with a second valve stem cap electrical contact; wherein upon installation of the valve stem cap, the first valve stem electrical contact makes electrical connection with the first valve stem cap electrical contact and the second valve stem electrical contact makes electrical connection with the second valve stem cap electrical contact, wherein the circuit is interrupted when the first valve stem electrical contact is separated from the first valve stem cap electrical contact and the second valve stem electrical contact is separated from the second valve stem cap electrical contact, wherein the circuit restored when the first valve stem electrical contact is connected to the first valve stem cap electrical contact and the second valve stem electrical contact is connected to the second valve stem cap electrical contact, c. a battery in series with the circuit for powering the circuit;

d. a pressure switch in series with the circuit having a lower resistance when the circuit is completed by the pressure switch and having an infinite resistance when the pressure switch opens the circuit;

e. a wireless transmitter receiving tire pressure data in the form of circuit voltage across the pressure switch and transmitting tire pressure data to a wireless receiver.

18. The device of claim 17 wherein the battery is located within the valve cap and wired in series with the circuit between the first valve stem cap electrical contact and the second valve stem cap electrical contact.

19. The device of claim 17 wherein both the battery and the wireless transmitter are located within the valve cap and wired in series with the circuit between the first valve stem cap electrical contact and the second valve stem cap electrical contact.

20. The device of claim 17 wherein the pressure switch is two-stage and produces two stage resistance leading to two levels of wireless transmitter readings corresponding to preset levels of air pressure.

21. The device of claim 17 wherein the pressure switch is continuously variable and produces continuously variable resistance leading to continuously variable levels of wireless transmitter readings corresponding to air pressure.

22. The device of claim 17 wherein the pressure switch is a variable resistance pressure switch.

23. The device of claim 17 wherein the pressure switch is a discrete resistance pressure switch.

24. The device of claim 17 wherein the pressure switch is in the valve stem.

* * * * *